United States Patent [19]
Danova

[11] 4,180,537
[45] Dec. 25, 1979

[54] METHOD OF MAKING CERAMIC, SOUND-PRODUCING, ORNAMENTAL ARTICLE

[76] Inventor: Cessare M. Danova, 1760 Franklin Ave., Santa Monica, Calif. 90404

[21] Appl. No.: 910,148

[22] Filed: Jun. 28, 1978

[51] Int. Cl.[2] ..... C04B 37/00
[52] U.S. Cl. ..... 264/62; 46/179; 29/416; 29/460; 116/137 R; 264/67; 264/263; 264/310
[58] Field of Search ..... 29/416, 460; 46/179; 264/60, 62, 67, 86, 311, 310, 263; 116/137 R

[56] References Cited

U.S. PATENT DOCUMENTS

| | | | |
|---|---|---|---|
| 938,225 | 10/1909 | Dowsing | 46/179 X |
| 1,499,282 | 6/1924 | Aramian | 46/179 |
| 2,106,415 | 1/1938 | Purington | 264/60 |
| 2,730,765 | 1/1956 | Crafton et al. | 264/310 X |
| 2,817,116 | 12/1957 | Miller et al. | 46/179 UX |
| 2,968,083 | 1/1961 | Lentz et al. | 264/262 UX |
| 3,304,603 | 2/1967 | Piker | 29/416 |
| 3,368,013 | 2/1968 | Pisciotta | 264/310 X |
| 3,397,887 | 8/1968 | Caplan | 264/310 X |
| 3,423,816 | 1/1969 | Grosh et al. | 29/416 |

*Primary Examiner*—Charlie T. Moon
*Attorney, Agent, or Firm*—Francis X. LoJacono

[57] ABSTRACT

A sound-producing, ornamental article formed from ceramic material having a shell-like housing defining a chamber, wherein a sound-producing element is fixedly concealed within the chamber, the housing including a first hole to allow air pressure to enter the housing chamber and a second hole to allow the air pressure to escape therefrom, whereby the flow of air through the chamber activates the sound-producing element therein; and wherein the method of making the article is disclosed utilizing a mold having a particular configuration in which the article is shaped, fired and glazed, wherein an insert section is formed having a sound-producing element attached thereto, after which the insert is secured to the shell housing, sealing the sound-producing element within the defined chamber.

4 Claims, 7 Drawing Figures

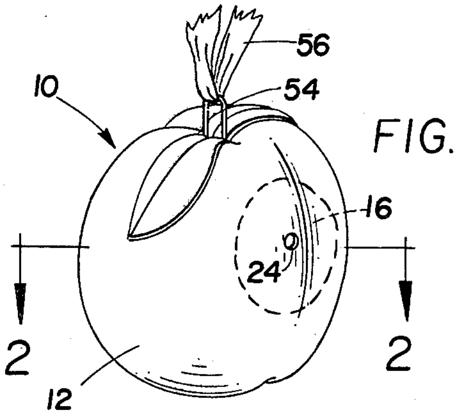
FIG. 1
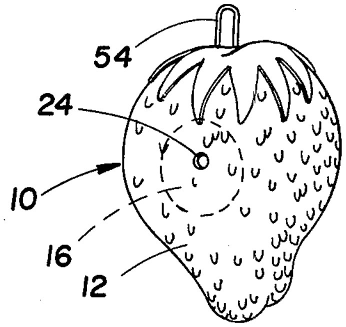
FIG. 6
FIG. 3
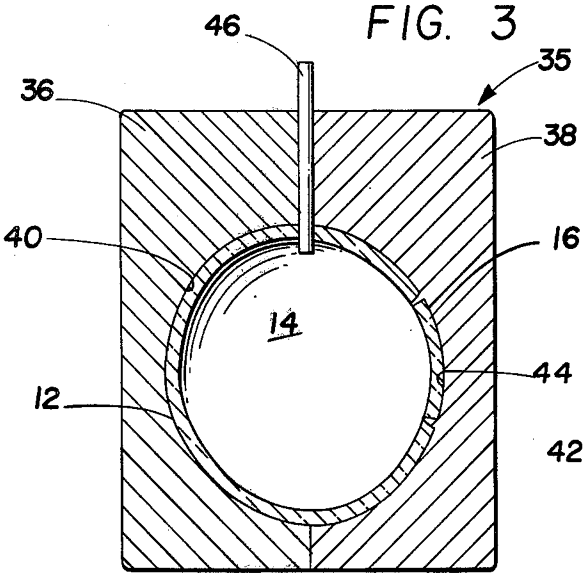
FIG. 4
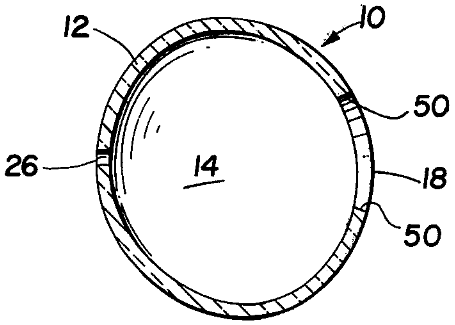
FIG. 5
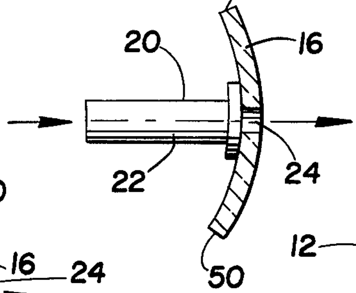
FIG. 2
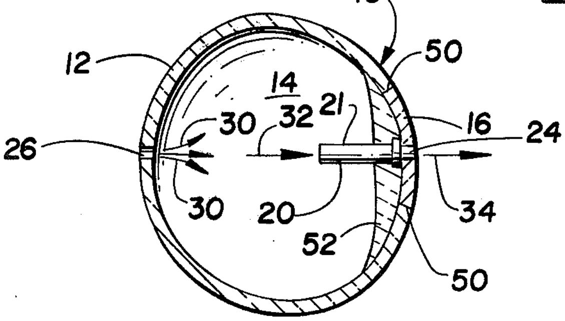
FIG. 7
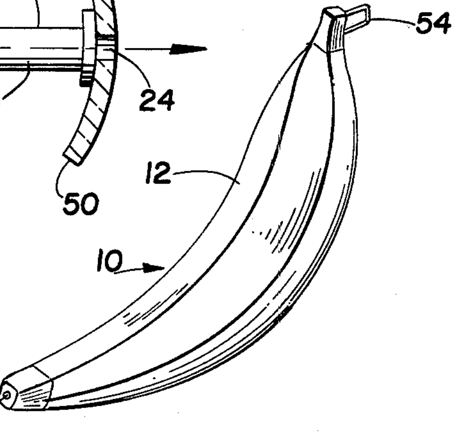

METHOD OF MAKING CERAMIC, SOUND-PRODUCING, ORNAMENTAL ARTICLE

BACKGROUND OF THE INVENTION

1. Field of the Invention

This invention relates to an ornamental article, and more particularly to an ornamental article made of a ceramic material and including a sound-producing element therein.

2. Description of the Prior Art

As is well known, there are many types of ornamental articles which also incorporate various sound-producing elements, such as a whistle to sound an alert or give a signal.

However, to the applicant's knowledge there is no such sound-producing article that is formed from a ceramic material having a hollow chamber in which a sound-producing device is encapsulated therein.

SUMMARY OF THE INVENTION

The present invention comprises an ornamental article which includes therein a sound-producing device, such as a whistle, wherein the article is formed from a ceramic material having a hollow body that is formed in a mold, and is also provided with an insert section to which a whistle-like member is secured.

After the whistle is secured to the insert section, the section is then affixed to the housing—thereby establishing a chamber having a first hole to allow air pressure to enter the chamber and a second hole to allow the air pressure to escape, the second hole being formed in the insert section and covered by the sound-producing element. Thus, air must pass through the whistle element as it leaves the chamber, producing a whistle-like sound.

OBJECTS AND ADVANTAGES OF THE INVENTION

The present invention has for an important object the forming of a sound-producing device constructed from a ceramic material of various defined configurations having a whistle-like element encapsulated within a chamber formed within the shell-like article.

It is another object of the invention to provide a novel and unusual ceramic ornamental article that can be worn by an individual and additionally have a useful noise-producing device.

It is still another object of the invention to produce and provide a ceramic sound-producing ornamental article that includes a novel method of producing such a device.

It is a further object of the invention to provide a device of this character that is relatively inexpensive to manufacture, and simple yet unique in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a pictorial view of a ceramic ornamental article having a configuration of a fruit;

FIG. 2 is a cross-sectional view thereof taken substantially along line 2—2 of FIG. 1 wherein the chamber is shown having the sound-producing element disposed therein;

FIG. 3 is a cross-sectional view illustrating the various steps in producing the ceramic article;

FIG. 4 is a cross-sectional view of the ceramic housing with the insert section removed therefrom prior to inserting the sound-producing element therein;

FIG. 5 is a cross-sectional view of the insert section having the sound-producing element (whistle) affixed to the insert thereof;

FIG. 6 is an ornamental, ceramic, sound-producing article having a configuration of a strawberry; and FIG. 7 illustrates still another configuration of the ornamental article having the appearance of a banana which is also constructed to include a sound-producing element therein.

DESCRIPTION OF THE PREFERRED EMBODIMENT

Referring more particularly to FIGS. 1 through 5, there is shown a ceramic, sound-producing, ornamental article, generally indicated at 10, having a configuration simulating a fruit, such as a peach. The article 10 is formed from a suitable ceramic-clay product that is well known in the art and is constructed having a shell-like housing 12 which defines an inner chamber 14. Housing 12 further includes an insert wall section 16 that is molded as a separate member of the housing. That is, as seen in FIG. 4, insert 16 is at this time not a part of the shell-like housing, wherein the housing is shown having an enlarged aperture 18 to accommodate insert wall section 16, as seen in FIG. 7.

After the basic configuration is molded, a sound-producing element 20 is affixed to insert wall section 16. It is contemplated that various sound-producing elements can be satisfactorily used; however, the preferred sound device would be as shown representing a small plastic whistle, wherein the whistle body 22 is secured to the insert wall section by any suitable attaching means such as glue.

Prior to securing whistle 20 to section 16, section 16 is provided with a hole 24, over which one end of whistle 20 and out of hole 24—thus allowing the whistle to be activated. The insert wall is then mounted in aperture 18 and secured to the housing having whistle 20 positioned in chamber 14.

Accordingly, shell-like housing 12 is also provided with a corresponding second hole 26 which allows one to blow air into chamber 14, indicated by arrows 30 in FIG. 2, wherein air pressure in chamber 14 escapes through whistle 20 and hole 24, as indicated by respective arrows 32 and 34.

Thus, it can be well understood that various configurations of ornamental pieces can be formed, depending upon the shapes of the molds (generally indicated at 35 in FIG. 3). As examples of the many configurations, there is shown in FIG. 6 an ornamental, ceramic, sound-producing article having the appearance of a strawberry; and in FIG. 7 the article simulates a small banana.

Hence, all of the above articles are formed in the following manner. First, there is provided a mold 35, generally having two half sections 36 and 38, wherein specifically designed cavities 40 and 42 are established in respective mold sections 36 and 38. Included in cavity 42 of mold section 38 is a defined portion 44 which allows the small wall section 16 to be separately formed.

An inlet tube 46 is positioned between the mold sections 36 and 38, whereby ceramic clay in a substantially liquid form is introduced into the overall cavity formed thereby. The step of forming a clay product in this manner is well known at this point; that is, the clay is allowed to form a shell along the surface of the mold cavity. When the shell thickness is established, the excess clay is removed—thus only the shell housing 12 remains.

After the green clay form is removed from mold 35, holes 24 and 26 are respectively located in section 16 and housing 12; and then they are fired at the required temperature which is well established in the art.

Following the first firing of the housing 12 and wall section 16, they are glazed to the predetermined colorations and then fired again. After these steps, the whistle unit 20 is secured to wall section 16 directly over hole 24, as previously described herein. The wall section 16 together with whistle unit 20 are inserted into aperture 18, as seen in FIG. 2.

Wall section 16 is secured to shell housing 12 along their corresponding annular edges, indicated at 50, at which time additional clay material 52 is inserted into chamber 14 and allowed to accumulate around whistle unit 20, thus covering the insert wall section 16 to a point wherein the green clay material 52 overlaps the adjoining edges 50, and allows the clay to dry and harden at room temperature or higher, but not so high that the heat would affect the whistle unit 20. The additional clay 52 forms an integral part of the housing and the insert wall.

A further step can be included wherein a support means is affixed to the article, such as shown in FIG. 1, wherein a looped wire member 54 is mounted to the article. This provides a means to allow a neck chain or ribbon 56 to support the article around one's neck.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A method of forming an ornamental sound-producing article consisting of a clay material comprising the steps of:

providing a mold having a predetermined-shape cavity;

forming a shell housing portion and an insert wall section of said clay in said cavity, said housing defining a chamber;

removing said housing and insert wall section from said mold;

forming a first hole in said housing;

forming a second hole in said insert wall section;

securing a sound-producing means to said insert wall over said second hole thereof; and affixing said insert wall to said housing wherein said sound-producing means is disposed in said chamber.

2. The method of claim 1, wherein after forming holes in said housing and said insert wall section, the following steps are included:

firing said housing and said insert;

glazing said housing and said insert; and the final firing thereof.

3. The method of claim 2, wherein said housing includes an aperture therein, and wherein affixing said insert wall to said housing comprises the steps of:

securing said insert wall within said aperture of said housing; and adding additional clay material in said chamber to cover said insert wall, wherein the additional clay material overlaps the housing adjacent said aperture.

4. The method of claim 3, wherein an additional step includes allowing said additional clay material to cure at room temperature, thus forming an integral part of said housing and said insert wall.

* * * * *